United States Patent
Jolda et al.

(10) Patent No.: US 9,690,729 B2
(45) Date of Patent: Jun. 27, 2017

(54) TABLET COMPUTER DOCK

(71) Applicants: VOLKSWAGEN AG, Wolfsburg (DE); AUDI AG, Ingolstadt (DE)

(72) Inventors: Matthew Jolda, Sunnyvale, CA (US); Jack Grossman, San Francisco, CA (US); Stefan Henze, Braunschweig (DE); James Toggweiler, San Francisco, CA (US)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 752 days.

(21) Appl. No.: 13/757,199

(22) Filed: Feb. 1, 2013

(65) Prior Publication Data

US 2014/0223065 A1    Aug. 7, 2014

(51) Int. Cl.
| | |
|---|---|
| *G06F 13/00* | (2006.01) |
| *G06F 13/36* | (2006.01) |
| *G06F 1/16* | (2006.01) |
| *B60R 11/02* | (2006.01) |
| *B60R 11/00* | (2006.01) |

(52) U.S. Cl.
CPC .......... *G06F 13/36* (2013.01); *B60R 11/0235* (2013.01); *B60R 11/0252* (2013.01); *G06F 1/1626* (2013.01); *G06F 1/1632* (2013.01); *G06F 13/00* (2013.01); *B60R 2011/0005* (2013.01); *B60R 2011/0015* (2013.01); *B60R 2011/0075* (2013.01); *B60R 2011/0082* (2013.01); *B60R 2011/0084* (2013.01); *B60R 2011/0092* (2013.01); *G09G 2380/10* (2013.01)

(58) Field of Classification Search
USPC ........ 710/300, 303, 304, 305, 313; 345/108, 345/110
See application file for complete search history.

(56) References Cited

U.S. PATENT DOCUMENTS

| | | | |
|---|---|---|---|
| 6,049,288 A * | 4/2000 | Kawasaki | 340/815.4 |
| 6,285,911 B1 * | 9/2001 | Watts et al. | 700/2 |
| 6,354,649 B1 * | 3/2002 | Lee | 296/70 |
| 8,072,743 B2 * | 12/2011 | Kissel | 361/679.21 |
| 8,140,220 B2 * | 3/2012 | Fujikawa et al. | 701/36 |
| 8,233,269 B2 * | 7/2012 | Hotary et al. | 361/679.01 |
| 2005/0128892 A1* | 6/2005 | Kuo et al. | 369/30.27 |
| 2006/0108900 A1* | 5/2006 | Lee | 312/319.6 |
| 2006/0277555 A1* | 12/2006 | Howard et al. | 720/600 |
| 2007/0138822 A1* | 6/2007 | Feit et al. | 296/70 |
| 2007/0171239 A1* | 7/2007 | Hunt et al. | 345/649 |
| 2008/0245922 A1* | 10/2008 | Fellhoelter | 242/554.6 |
| 2009/0128307 A1* | 5/2009 | Hentsch et al. | 340/425.5 |
| 2012/0331511 A1* | 12/2012 | Chen | 725/75 |
| 2013/0157647 A1* | 6/2013 | Kolodziej | 455/419 |
| 2013/0259261 A1* | 10/2013 | Mitchell | 381/86 |
| 2014/0095000 A1* | 4/2014 | Waller et al. | 701/2 |

FOREIGN PATENT DOCUMENTS

WO    2012080699 A1    6/2012

* cited by examiner

*Primary Examiner* — Khanh Dang
(74) *Attorney, Agent, or Firm* — Barnes & Thornburg LLP (57) ABSTRACT

A tablet computer dock for use in a passenger vehicle is configured to support a tablet computer for use or storage inside the passenger vehicle. The tablet computer dock illustratively includes a tablet receiver that defines a compartment sized to receive a tablet computer. The compartment is accessible through a slot sized to allow the tablet computer to pass into and out of the compartment.

27 Claims, 9 Drawing Sheets

TABLET COMPUTER DOCK

BACKGROUND

The present disclosure relates to a mobile device dock for use in a passenger vehicle. In particular, the present disclosure is directed to a tablet computer dock configured to support a tablet computer for both use and storage within the passenger vehicle.

SUMMARY

According to the present disclosure, a tablet computer dock for use in a passenger vehicle is configured to support a tablet computer for use and/or storage inside the passenger vehicle. The tablet computer dock illustratively includes a tablet receiver that defines a compartment sized to receive a tablet computer. The compartment is accessible through a slot sized to allow the tablet computer to pass into and out of the compartment.

In illustrative embodiments, the tablet computer dock also includes a tablet positioner that provides positioning means for moving the tablet computer between an insert/eject position, a use position, and a stowed position. In the insert/eject position, the tablet computer is arranged to be pushed into or pulled out of the compartment of the tablet receiver by a user. In the use position, a portion of the tablet computer is exposed outside the compartment for use by a passenger in the vehicle and the tablet computer is supported by the tablet receiver for transport inside the passenger vehicle. In the stowed position, the tablet computer hidden inside the tablet receiver to discourage theft of the tablet computer.

In illustrative embodiments, the tablet positioner includes a drive with a motor and a drive roller coupled to the motor. The drive roller is illustratively arranged inside the compartment to engage the tablet computer when the tablet computer inserted into the compartment through the slot. The drive is configured to rotate the drive roller to move the tablet computer between the insert/eject position, the use position, and the stowed position.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which:

FIGS. 11-13 are a series of perspective views showing a second passenger vehicle including a seat and a tablet computer dock coupled to the seat, and showing that the tablet computer dock is configured to move a tablet computer between an insert/eject position, a use position, and a stowed position;

FIGS. 14-16 are a series of perspective views showing a third passenger vehicle including a dashboard and a tablet computer dock arranged in the dashboard above a glove box, and showing that the tablet computer dock is configured to move a tablet computer between an insert/eject position, a use position, and a stowed position;

DETAILED DESCRIPTION

Figure 3:
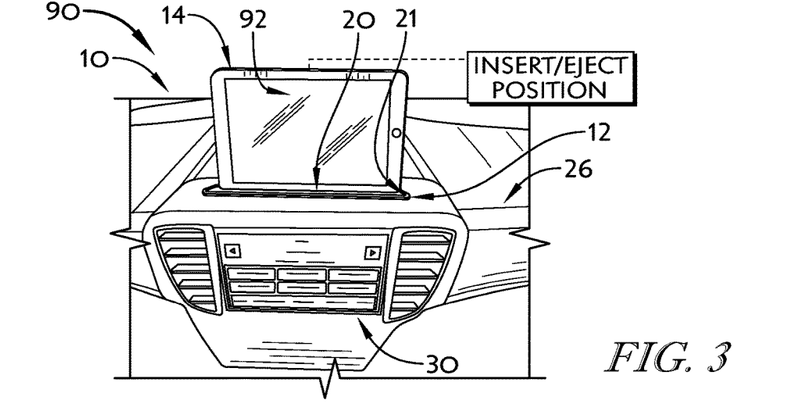
FIG. 3 is a partial perspective view similar to FIGS. 1 and 2 showing the tablet computer in an insert/eject position in the tablet computer dock in which an insert portion of a tablet computer is received in a tablet receiver included in the tablet computer dock.
Figure 4:
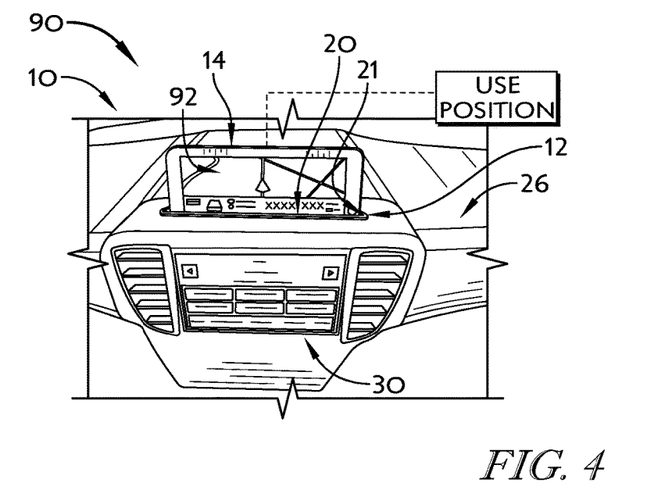
FIG. 4 is a view similar to FIG. 3 showing the tablet computer moved to a use position in the tablet computer dock in which a support portion of the tablet computer (larger than the insert portion of the tablet computer) is received in the tablet receiver of the tablet computer dock.
Figure 5:
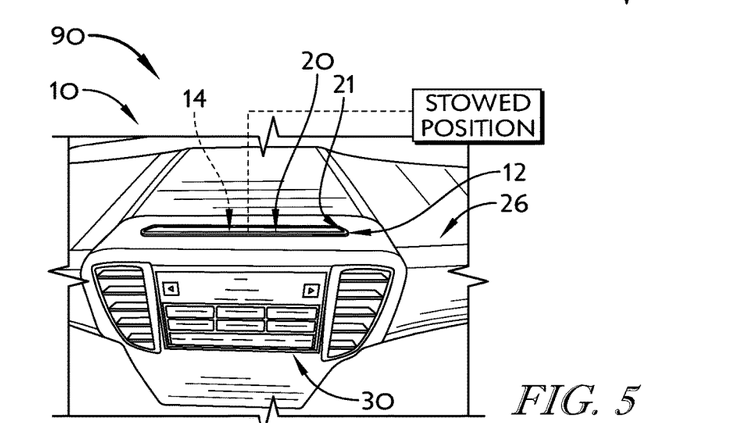
FIG. 5 is a view similar to FIGS. 3 and 4 showing the tablet computer moved to a stowed position in the tablet computer dock in which all of a tablet computer is received in the tablet receiver of the tablet computer dock.

According to the present disclosure, an illustrative passenger vehicle 10 includes a tablet computer dock 12 configured to support a tablet computer 14 for use or storage inside the passenger vehicle 10 as shown in FIGS. 1-5. A user can insert the tablet computer 14 into the dock 12 as suggested by arrow 11 in FIG. 1 and the tablet computer 14 will be supported by the dock 12 for use. The tablet computer 14 can also be moved within the dock 12 so that the tablet computer 14 is hidden from view, as shown in FIG. 5, to discourage theft of the tablet computer 14 when the passenger vehicle 10 is unattended.

Figure 6:
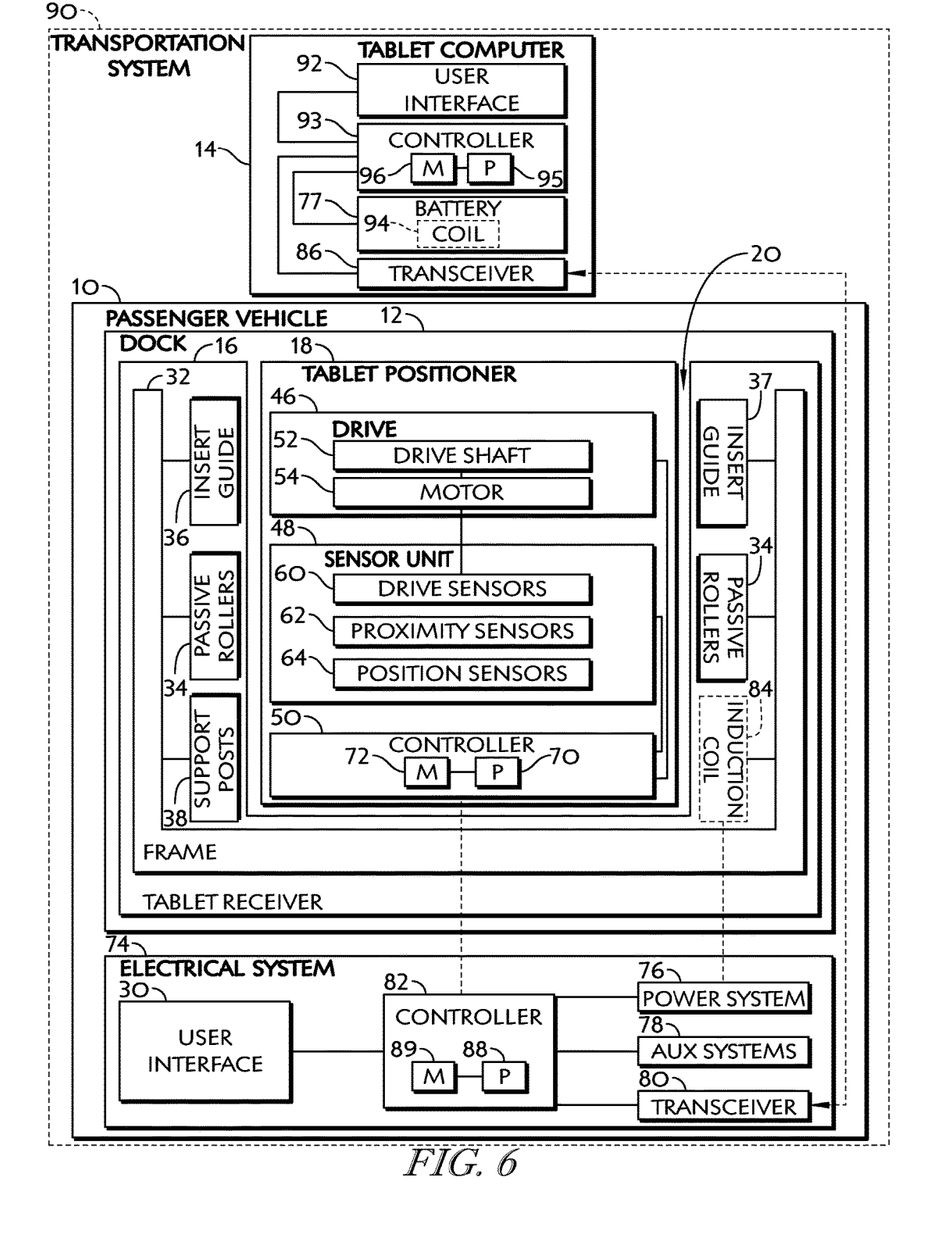
FIG. 6 is a diagrammatic view of the passenger vehicle and tablet computer of FIGS. 1-5 showing that the passenger vehicle and the tablet computer cooperate to form a transportation system, and showing that the tablet computer dock includes a tablet receiver and a tablet positioner configured to move the tablet computer within the tablet receiver between the insert/eject, use, and stowed positions.

The dock 12 includes a tablet receiver 16 and a tablet positioner 18 as shown diagrammatically in FIG. 6. The tablet receiver 16 defines a compartment 20 that is sized to receive the tablet computer 14 and is accessible through a slot 21. The tablet positioner 18 is configured to move the tablet computer 14 between an insert/eject position, a use position, and a stowed position within the tablet receiver 16 so that the tablet computer 14 can be operated by a user in the passenger vehicle 10 or stored within the dock 12 to prevent theft of the tablet computer 14 as shown in FIGS. 3-5.

Figure 1:
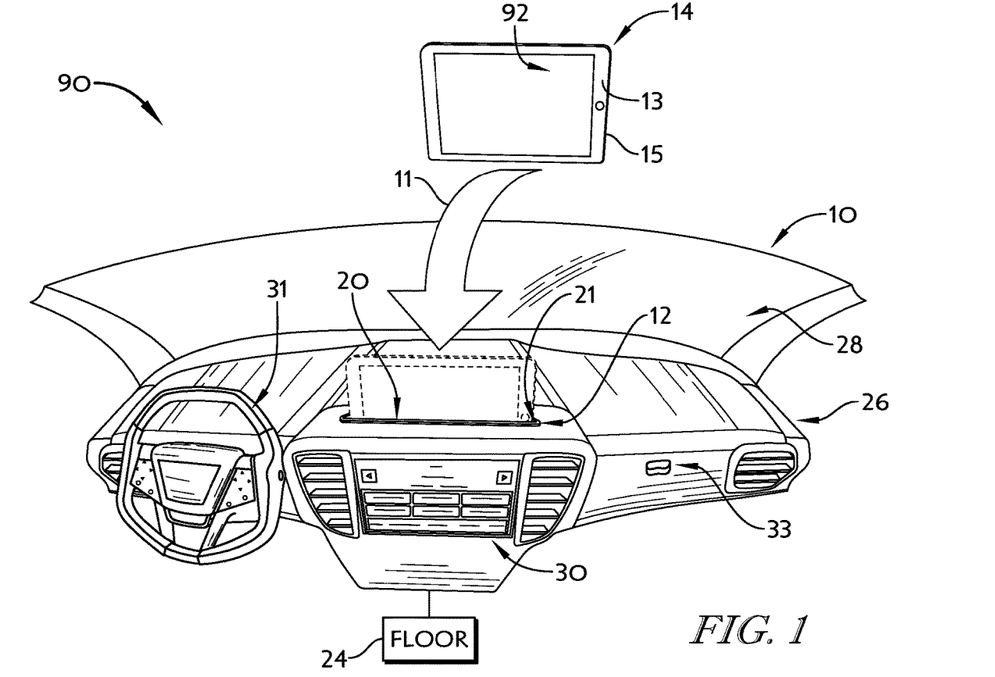
FIG. 1 is a partial perspective view of a passenger vehicle including a tablet computer dock arranged in a dashboard of the passenger vehicle showing a tablet computer prior to being inserted into the tablet computer dock.
Figure 2:
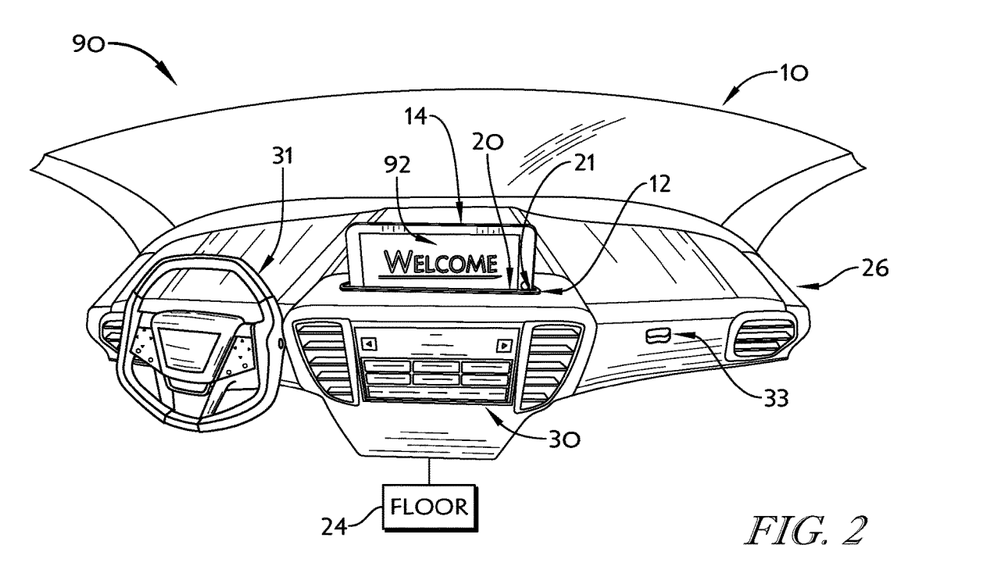
FIG. 2 is a view similar to FIG. 1 showing the tablet computer inserted into the tablet computer dock and activated for use by a user in the passenger vehicle.

The illustrative passenger vehicle 10 is an automobile that includes a floor 24, a dashboard 26 arranged above the floor 24, a windshield 28 extending upwardly from the dashboard 26, and a user interface 30 mounted to the dashboard 26 as shown in FIGS. 1 and 2. The compartment 20 defined by the tablet receiver 16 is inside the dashboard 26 between the windshield 28 and the user interface 30. The compartment 20 is arranged in a plane substantially perpendicular to a plane defined by the floor 24; thus, when the tablet computer 14 is inserted in the dock 12 the tablet computer 14 can be used as an extension of the user interface 30 as suggested in FIG. 2. In other embodiments, the passenger vehicle 10 may be a boat, a train, a plane, a tractor, or the like.

Figure 7:
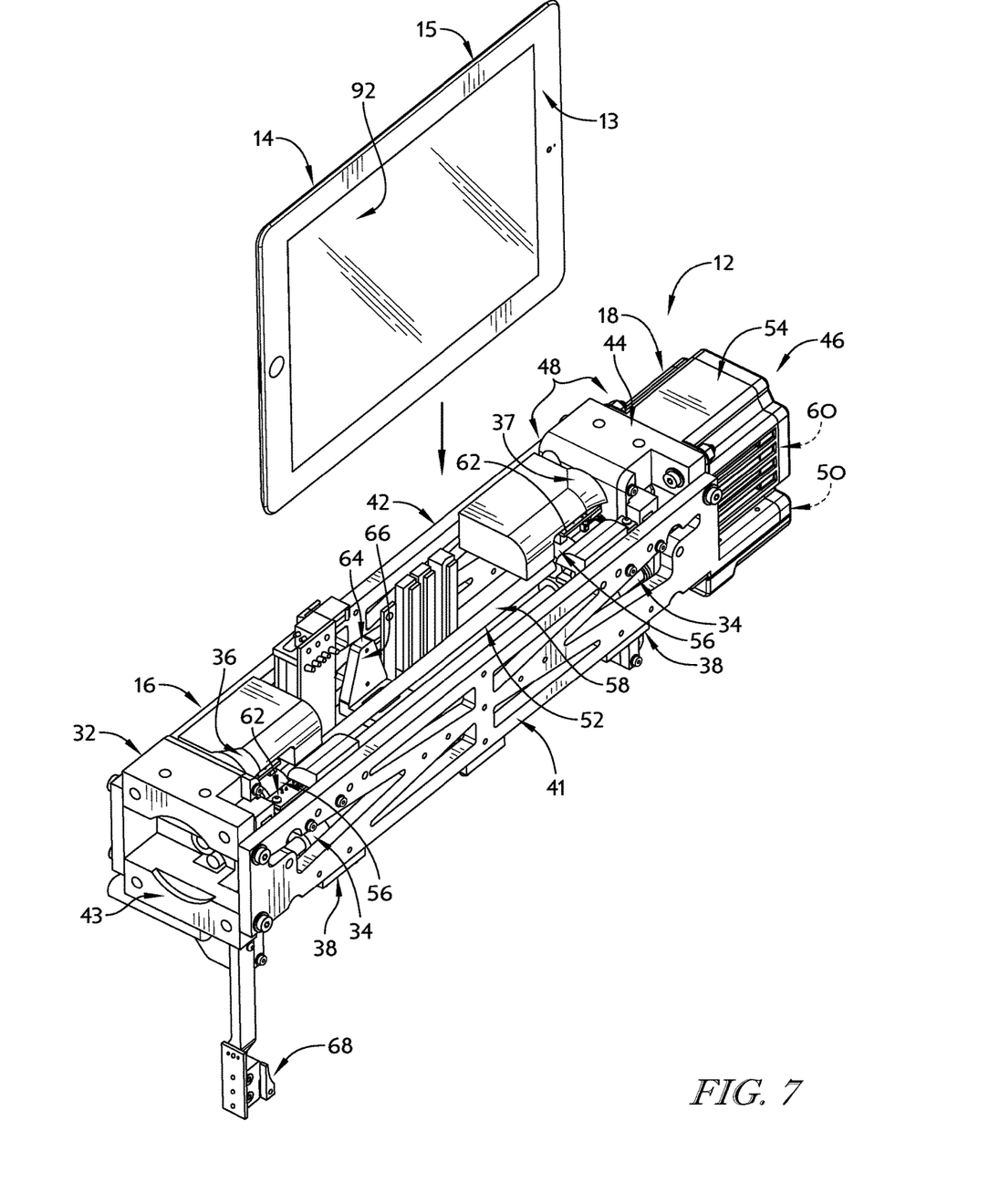
FIG. 7 is a perspective view of the tablet computer along with the tablet computer dock removed from the dashboard of the passenger vehicle.
Figure 8:
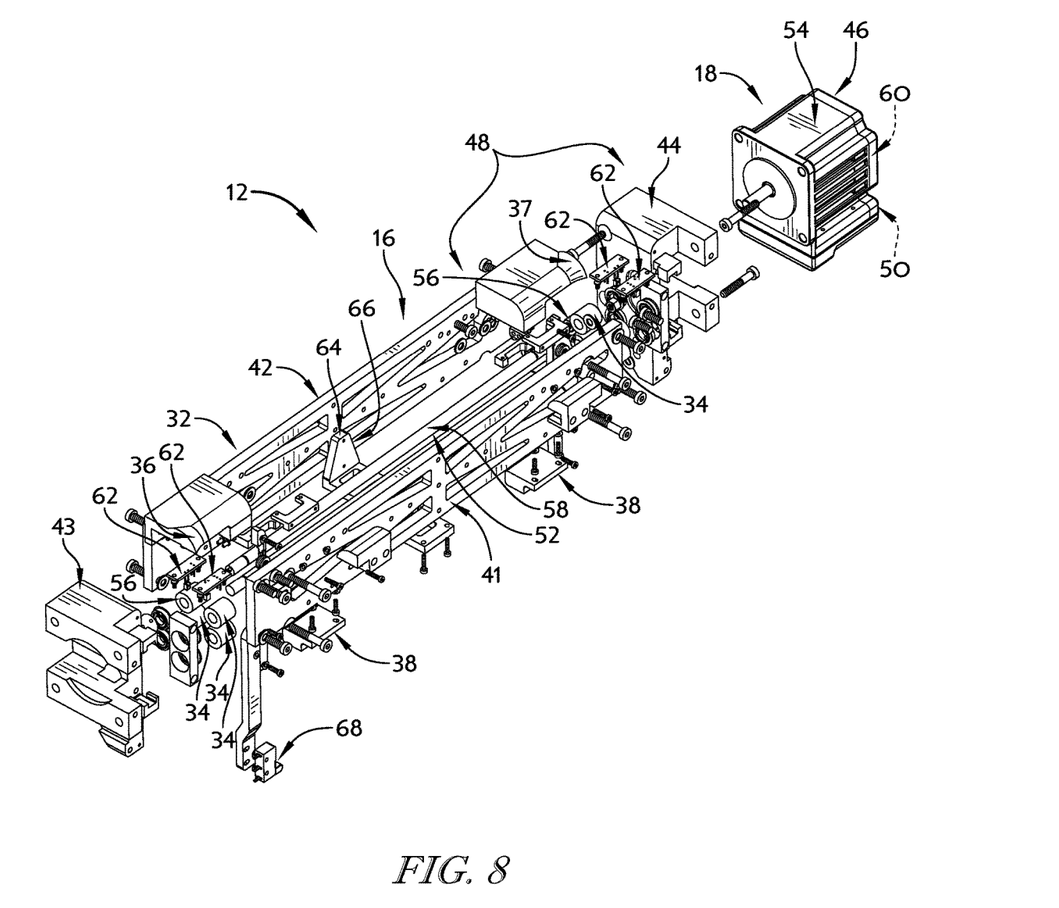
FIG. 8 is an exploded perspective view of the tablet computer dock of FIG. 7.

The tablet receiver 16 forms the compartment 20 that receives the tablet computer 14 and is configured to support the tablet computer 14 when the tablet computer 14 is inserted into the compartment 20 as shown diagrammatically in FIG. 6 and in an exemplary embodiment in FIGS. 7 and 8. The tablet receiver 16 illustratively includes a frame 32, a plurality of passive rollers 34, a pair of insert guides 36, 37, and a support post 38. The frame 32 defines the compartment 20 and the slot 21 of the dock 12. The passive rollers 34 contact and guide the tablet computer 14 as the tablet computer 14 moves into and out of the compartment 20. The insert guides 36, 37 are shaped to ensure that the tablet computer 14 is inserted into the compartment 20 in the proper orientation for a user to operate the tablet computer 14 from inside the passenger vehicle 10. The support post 38 is coupled to the frame 32 and provides support to the tablet computer 14 when the tablet computer 14 is cantilevered outside the compartment 20, for example when the tablet computer 14 is in the use or insert/eject position.

The frame 32 is configured to be coupled to the dashboard 26 and illustratively includes front, back, left, and right panels 41, 42, 43, 44 as show in FIGS. 6-8. The panels 41, 42, 43, 44 of the frame 32 cooperate to define the compartment 20 and the slot 21. The frame 32 also supports the other components of the tablet receiver 16 and the tablet positioner 18.

The passive rollers 34 are arranged in the compartment 20 to engage a front surface 13 and a back surface 15 of the tablet computer 14 when the tablet computer 14 is inserted into the compartment 20. The passive rollers 34 are coupled to the frame 32 and both roll and compress slightly when the tablet computer 14 is inserted into the compartment 20 so that the tablet computer 14 is securely held in the tablet receiver 16. In the illustrative embodiment, the passive rollers 34 are made from rubber but in other embodiments may be made of other elastic of non-elastic materials. In some embodiments, the passive rollers 34 may be mounted to the frame 32 using spring assemblies (such as spring washer stacks etc) and/or adjustable suspension components to provide the passive rollers 34 the ability to engage various tablet computers 14 with different thicknesses.

The insert guides 36, 37 are coupled to the frame 32 along the slot 21 that provides access into the compartment 20. Each insert guides 36, 37 is formed to include a surface 45 sized to correspond to the back surface 15 of the tablet computer 14. In the illustrative embodiment, the back surface 15 of the tablet computer includes convex rounded edges and corners as shown in FIG. 7. The insert guides 36, 37 may be interchangeable depending on the type of tablet computer 14 to be used with the dock 12. Also, in some embodiments, the insert guides 36, 37 may be mounted to the frame 32 via adjustable suspension components to provide the ability to engage various tablet computers 14 with different thicknesses.

The tablet positioner 18 of the dock 12 is configured to engage and move the tablet computer 14 when the tablet computer 14 is inserted into the tablet receiver 16. The tablet position 18 thus provides positioning means for moving the tablet computer 14 between an insert/eject position, a use position, and a stowed position as suggested in FIGS. 3-5. The tablet positioner 18 illustratively includes a drive 46, a sensor unit 48, and a controller 50 as shown diagrammatically in FIG. 6 and in an exemplary embodiment in FIGS. 7 and 8. The drive 46 is configured to engage the tablet computer 14 when the tablet computer 14 is inserted into the tablet receiver 16 and to move the tablet computer 14 between positions. The sensor unit 48 is configured to detect insertion of the tablet computer 14 into the tablet receiver 16 and to detect user inputs corresponding to requests to move the tablet computer 14 within the tablet receiver 16. The controller 50 is coupled to the drive 46 and to the sensor unit 48 to control movement of the tablet computer 14 in the tablet receiver 16.

The drive 46 illustratively includes a drive shaft 52 and a motor 54 as shown diagrammatically in FIG. 6 and in an exemplary embodiment in FIGS. 7 and 8. The drive shaft 52 is arranged to engage the back surface 15 of the tablet computer 14 to drive movement of the tablet computer 14. The drive shaft 52 illustratively includes a pair of rubber drive rollers 56 and a rod 58 as shown in FIG. 8. The motor 54 is illustratively a coupled directly to the drive shaft 52 and turns the drive shaft 52 in two directions.

The sensor unit 48 provides inputs to the controller 50 so that the controller 50 can control movement of the tablet computer 14 in the tablet receiver 16. The sensor unit 48 illustratively includes drive sensors 60, proximity sensors 62, and position sensors 64 as shown diagrammatically in FIG. 6 and in an exemplary embodiment in FIGS. 7 and 8. The drive sensors 60 are illustratively coupled to the motor 54 and are configured to detect if a user pulls up on or pushes down on the tablet computer 14 is inserted in the tablet receiver 16. The proximity sensors 62 are coupled to the frame 32 along the slot 21 and are configured to detect a user input corresponding to user's hand waving over the slot 21. The position sensors 64 illustratively include optical sensors 66 located inside the compartment 20 and a microswitch 68 located at the bottom of compartment 20. The optical sensors 66 detect the position of the tablet computer in the compartment 20. The microswitch 68 detects if the tablet computer 14 is contacting the bottom of the compartment 20.

The controller 50 included in the dock 12 illustratively includes a processor 70 and a memory 72 coupled to the processor 70. The processor 70 is configured to receive signals from the sensor unit 48 and to perform instructions stored on the memory 72. The memory 72 is illustratively a readable/writable memory but can be any other suitable type of memory and includes instructions to be performed by the processor 70 among other things.

In operation, tablet positioner 18 is configured to move the tablet computer 14 within the tablet receiver 16 between the insert/eject position (shown in FIG. 3), the use position (shown in FIG. 4), and the stowed position (shown in FIG. 5). In the insert/eject position, an insert portion of a tablet computer 14 is received in the compartment 20. In the use position, a support portion, larger than the insert portion of a tablet computer 14, is received in the compartment 20. While the support portion is received in the compartment 20, a use portion of the tablet computer 14 exposed such that the use portion of the tablet computer 14 is positioned for use by a user in the passenger vehicle 10. In the stowed position, all of the tablet computer 14 is received in the compartment 20 so that the tablet computer 14 is hidden from view and secured inside the dashboard 26.

In addition to the dock 12, the passenger vehicle 10 also includes an electrical system 74 coupled to the dock 12 as shown diagrammatically in FIG. 6. The electrical system 74 of the passenger vehicle 10 illustratively includes a power system 76, auxiliary systems 78, a transceiver 80, the user interface 30, and a controller 82. As shown in FIGS. 1 and 2, the user interface 30 is coupled to the dashboard 26 between a steering wheel 31 and a glove box 33.

The power system 76 illustratively powers the passenger vehicle 10 and includes an engine, an alternator, and a battery (not shown). The power system 76 may be coupled to an optional induction coil 84 included in the tablet receiver 16 of the dock 12 as shown in FIG. 6. The induction coil 84 may be configured to wirelessly charge a battery 77 of the tablet computer 14 via a corresponding induction coil 94 included in the tablet computer 14 when it is in the tablet receiver 16.

The auxiliary systems 78 illustratively include components in the passenger vehicle 10 that may be controlled by or provide input for the tablet computer 14. Examples of auxiliary systems include infotainment systems, heating/cooling systems, communication systems, and the like.

The transceiver 80 is configured to communicate with the tablet computer 14 via a corresponding transceiver 86 included in the tablet computer 14. In the illustrative embodiment, the transceivers 80, 86 communicate via wireless communication protocols (i.e. Bluetooth) but in other embodiments may communicate via a wired connection.

The controller 82 is coupled to each of the other components 76, 78, 80, 30 of the electrical system 74 to receive information from and to control the other components 76, 78, 80, 30 as shown in FIG. 6. The controller 82 illustratively includes a processor 88 and a memory 89 coupled to the processor 88. The processor 88 is configured to perform instructions stored on the memory 89. The controller 82 is further coupled to the controller 50 of the dock 12 to exchange information and instructions. In some embodiments, the controllers 82 and 50 may be combined into one controller or may be made up of a plurality of interconnected controllers.

The tablet computer 14 cooperates with the passenger vehicle to provide a transportation system 90 as shown diagrammatically in FIG. 6. The transportation system 90 allows control of the tablet computer 14 by the passenger vehicle 10 and control of some aspects of the passenger vehicle 10 by the tablet computer 14. For example, the passenger vehicle 10 may display navigation information on a portion of the tablet computer 14, as shown in FIG. 4, and the tablet computer 14 may send preset music playlists to the infotainment system of the passenger vehicle 10.

The tablet computer 14 is illustratively a consumer device commonly used by vehicle passengers as shown in FIGS. 1 and 2. The illustrative tablet computer 14 includes a touch-screen user interface 92 and a controller 93 as shown diagrammatically in FIG. 6. The controller 93 includes a processor 95 and a memory 96 holding instructions to be performed by the processor 95. The controller 93 is coupled to the transceiver 86 and to the user interface 92. In other embodiments, the tablet computer 14 may be replaced by other mobile devices such as mobile phones, laptop computers, PDAs, and the like.

Figure 9:
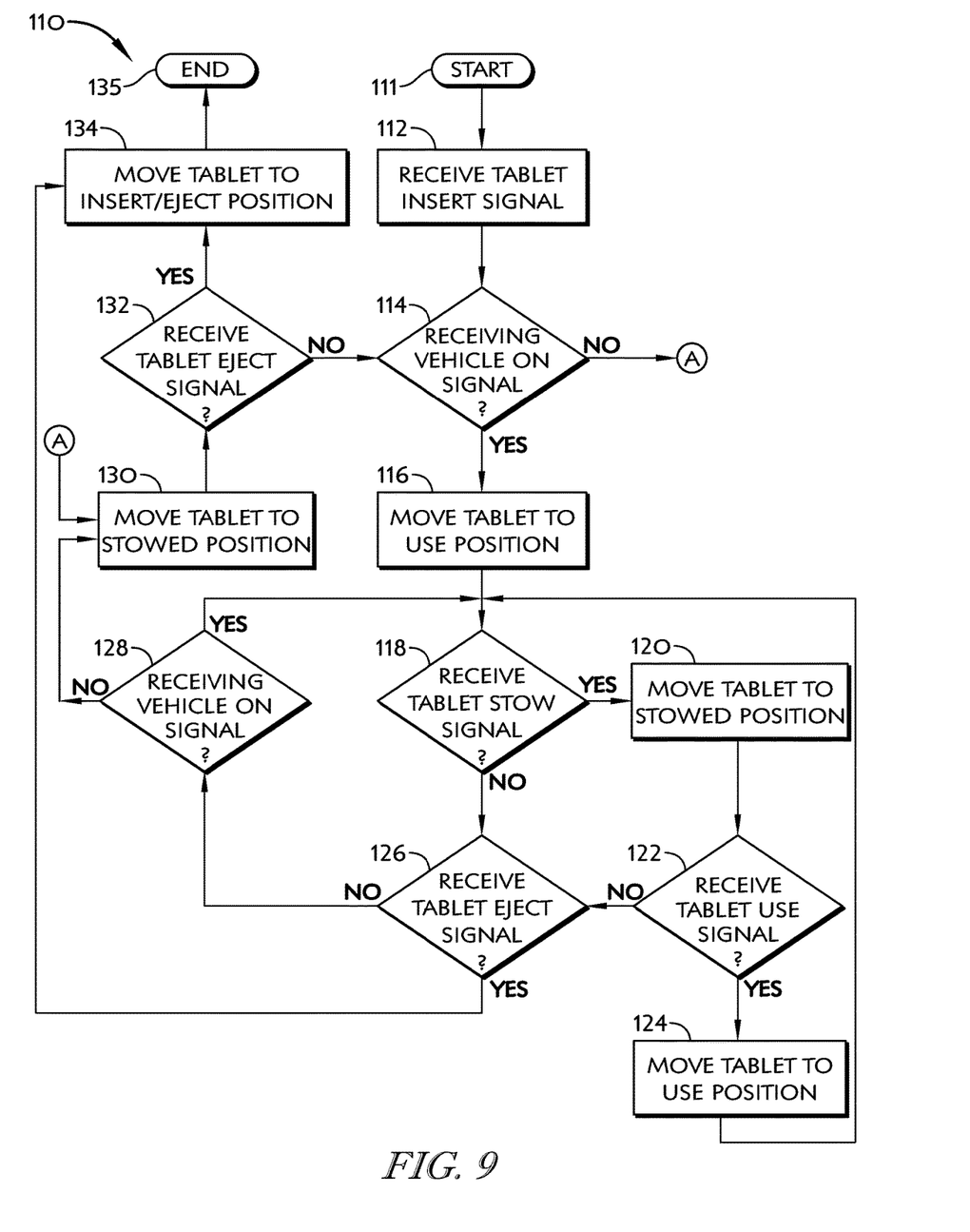
FIG. 9 is a flow chart showing a process performed by a controller included in the tablet computer dock of FIGS. 1-8.

An illustrative process 110 performed by the controller 50 of the tablet computer dock 12 begins at a start 111 as shown in FIG. 9. In an operation 112, the controller 50 receives a tablet insert signal from the drive sensors 60 included in the sensor unit 48 when the tablet computer 14 engages the drive rollers 56. Then, in an operation 114, the controller checks to see if a signal is being received from the electrical system 74 indicating that the vehicle 10 is on (engine running, accessory mode, etc). If the vehicle 10 is not running, the process 110 skips ahead to an operation 130 in which the tablet positioner 18 moves the tablet computer 14 to the stowed position so that the tablet computer 14 is protected from theft. If the vehicle 10 is on, the process proceeds to an operation 116 in which the tablet computer 14 is moved by the tablet positioner 18 to the use position.

After the tablet computer 14 is moved to the use position in operation 116, the process 110 advances to a decision operation 118 in which the controller 50 determines if a tablet stow signal is received as shown in FIG. 9. The stow signal is illustratively received from the drive sensors 60 when a user pushes the tablet computer 14 into the compartment 20. In other embodiments, the stow signal may be received in response to a user pressing a stow button (not shown) included in the dock 12. If the stow signal is received, the controller 50 moves the tablet computer 14 to the stowed position via the tablet positioner 18 in an operation 120. If the stow signal is not received, the process 110 skips ahead to decision operation 126 to determine if a tablet eject signal is received.

From operation 120, the process 110 moves on to a decision operation 122 to determine if a tablet use signal is received as shown in FIG. 9. A tablet use signal is illustratively received when a user moves her hand over the slot 21 to activate the proximity sensors 62. In other embodiments, the use signal may be received in response to a user pressing a use button (not shown) included in the dock 12. If the use signal is received, the process 110 advances to operation 124 and moves the tablet computer 14 to the use position and loops back around to decision operation 118. If the use signal is not received, the process 110 moves on to decision operation 126 to determine if the tablet eject signal is received.

In decision operation 126, the controller 50 determines if the tablet eject signal is received from the drive sensors 60 as shown in FIG. 9. The eject signal is received when a user is pulls the tablet computer 14 to move the tablet computer 14 out of the compartment 20 through the slot 21. In other embodiments, the eject signal may be received from an eject button (not shown) included in the dock 12. If the controller 50 receives the eject signal, the process 110 moves on to an operation 134 and moves the tablet computer 14 to the insert/eject position to allow a user to remove the tablet computer 14 from the dock 12. If the controller 50 does not receive the eject signal, the process moves on to a decision operation 128 to determine if the vehicle 10 is on.

In decision operation 128, if the controller 50 determines that the vehicle 10 is on, the process 110 loops back to decision operation 118 as shown in FIG. 9. If the controller 50 determines that the vehicle 10 is off, then the process 110 advances to the operation 130. In the operation 130, the controller 50 moves the tablet computer 14 to the stowed position via the tablet positioner 18 so that the tablet computer 14 is hidden from view and inaccessible inside the tablet computer dock 12.

Following operation 130, the process 110 advances to a decision operation 132 to determine if the tablet eject signal is received as shown in FIG. 9. When the vehicle 10 is off, the tablet eject signal is received when a user moves her hand over the slot 21 to activate the proximity sensors 62. In other embodiments, the eject signal may be received in response to a user pressing an eject button (not shown) included in the dock 12. If the eject signal is not received in decision operation 132, the process 110 loops back around to decision operation 114 to determine if the vehicle 10 is turned on. If the eject signal is received in decision operation 132, the process 110 advances to operation 134 and moves the tablet computer 14 to the insert/eject position to allow a user to remove the tablet computer 14 from the dock 12. After the tablet computer 14 is moved to the insert/eject position, the process 110 ends at an operation 135.

Figure 10:
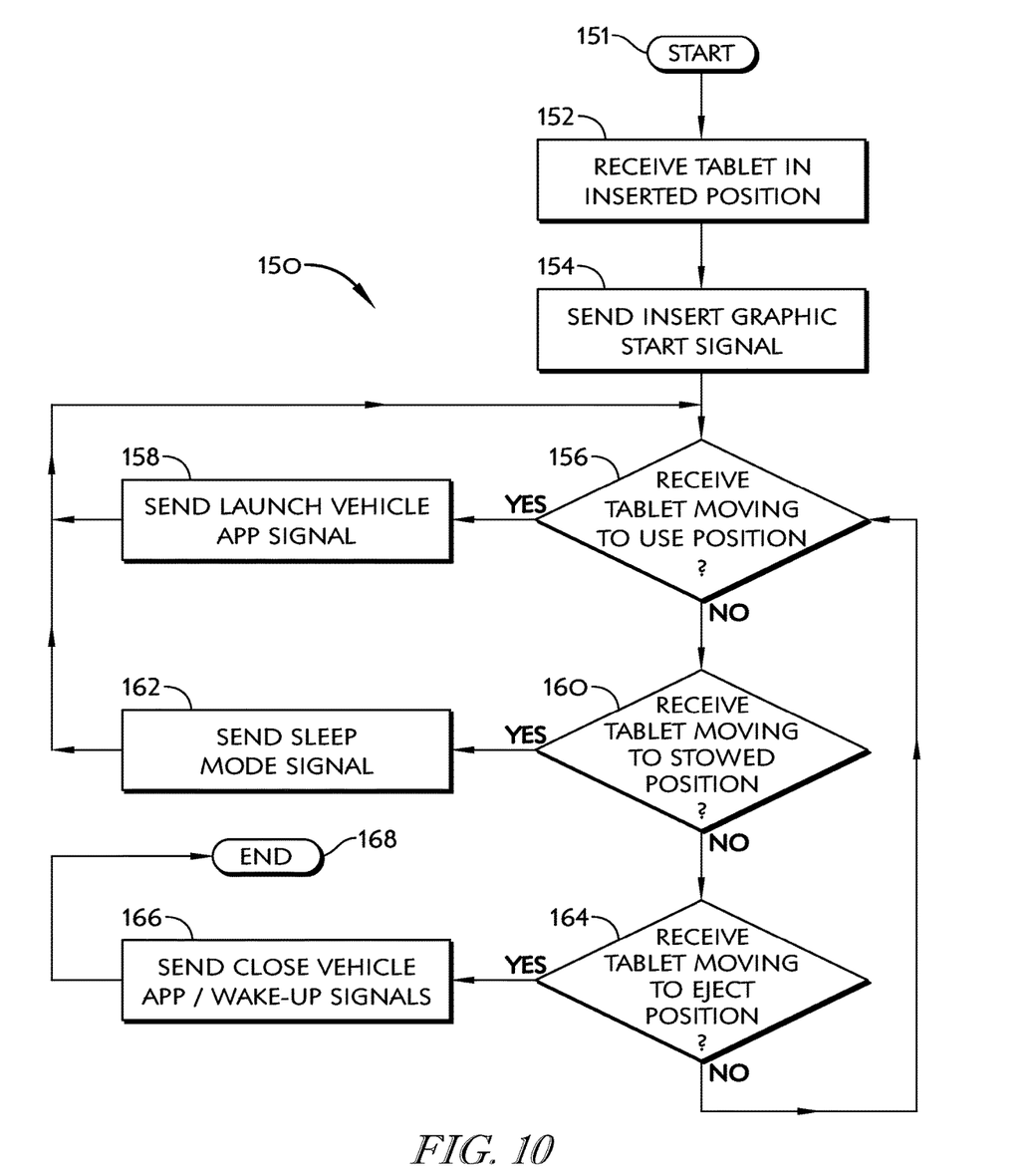
FIG. 10 is a flow chart showing a process performed by a controller included in an electrical system of the passenger vehicle of FIGS. 1-8.

Turning now to FIG. 10, an illustrative process 150 performed by the controller 82 of the electrical system 74 begins at a start 151. The process 150 includes an operation 152 in which the controller 82 receives a signal indicating that the tablet computer 14 has been inserted into the dock 12 from the controller 50 included in the dock 12. After operation 152, the process 150 proceeds to an operation 154 in which the controller 84 sends a signal to the tablet computer 14 via the transceivers 80, 86 indicating to the tablet computer that an insert graphic should be displayed on the user interface 92. In the illustrative embodiment, the insert graphic includes a welcome message as shown in FIG. 2 but in other embodiments may include a logo, a dynamic image, and/or a personalized message. In some embodiments, the insert graphic may be coordinated with the movement of the tablet computer 14 from the insert/eject position to the use position or the stowed position and, in some embodiments, a corresponding sound may be played through speakers in the tablet computer 14 or in the vehicle 10.

After operation 154, the process 150 proceeds to a decision operation 156 in which the controller 84 determines if a tablet moving to use position signal is received from the controller 50 as shown in FIG. 10. If the moving to use position signal is received, then the controller 84 sends a launch vehicle application signal to the tablet computer 14 in an operation 158. The vehicle application is configured to adjust the viewing window of the tablet computer to match the exposed portion of the user interface 92 and may reduce the available sub-application icons available or automatically launch a sub-application, such as a GPS mapping application as shown in FIG. 4. After performing operation 158, the process 150 loops back to decision operation 156 to check for movement of the tablet computer 14. If the moving to use position signal is not received, the controller 84 proceeds to another decision operation 160 in the process 150.

In the decision operation 160 of the process 150, the controller 84 determines if a tablet moving to stowed position signal is received from the controller 50 as shown in FIG. 10. If the moving to stowed position signal is received, then the controller 84 sends a sleep mode signal to the tablet computer 14 in an operation 162. In sleep mode, the tablet computer 14 turns off its touch-screen user interface 92 and conserves energy since the tablet computer 14 is not accessible for use. After performing operation 162, the process 150 loops back to decision operation 156 to check for movement of the tablet computer 14. If the moving to stowed position signal is not received, the controller 84 proceeds to another decision operation 164 in the process 150.

In the decision operation 164 of the process 150, the controller 84 determines if a tablet moving to eject position signal is received from the controller 50 as shown in FIG. 10. If the moving to eject position signal is received, then the controller 84 sends close vehicle application and wake-up signals to the tablet computer 14 in an operation 166. When the vehicle-specific application is closed and the tablet computer 14 is woken up, the tablet computer 14 is ready for use outside of transportation system 90 when ejected from the dock 12 and the process 150 ends at an operation 168. If the moving to eject position signal is not received, the process 150 loops back around to decision operation 156 described above.

Figure 11:
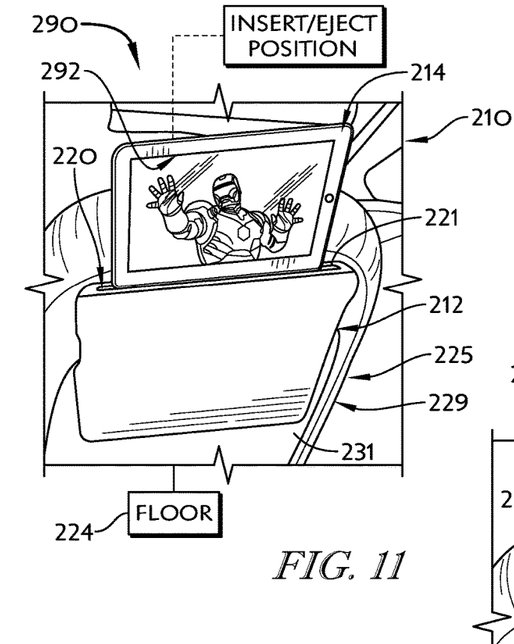
FIG. 11 is a perspective view of the second passenger vehicle showing the tablet computer moved to an insert/eject position in the tablet computer dock.
Figure 12:
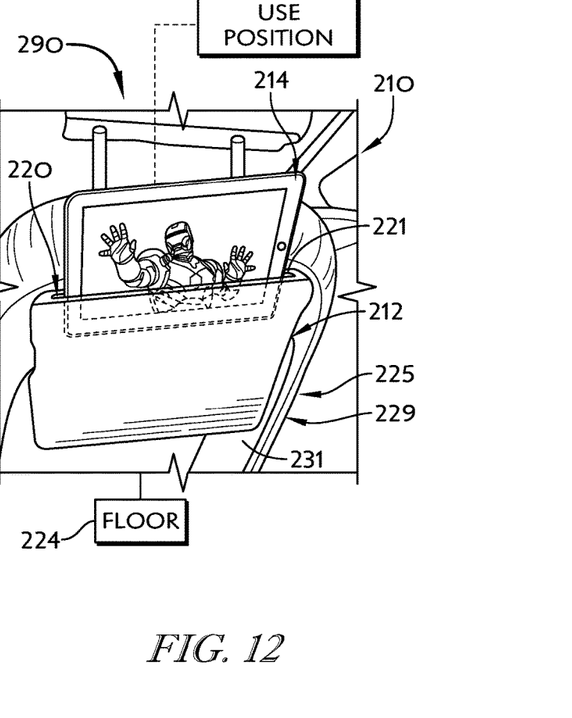
FIG. 12 is a view similar to FIG. 11 showing the tablet computer moved to a use position in the tablet computer dock.
Figure 13:
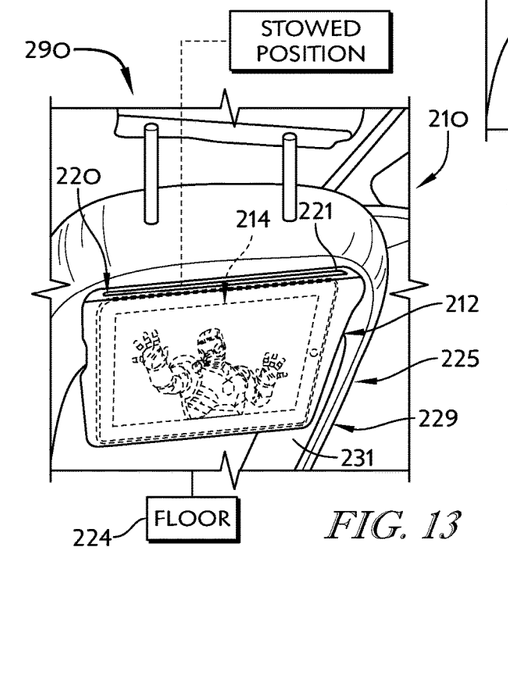
FIG. 13 is a view similar to FIGS. 11 and 12 showing the tablet computer moved to a stowed position in the tablet computer dock.

A second illustrative vehicle 210 is shown in FIGS. 11-13. The vehicle 210 is configured for use in a transportation system 290 and is substantially similar to the vehicle 10 shown in FIGS. 1-10 and described herein. Accordingly, similar reference numbers in the 200 series indicate features that are common between the vehicle 10 and the vehicle 210. The description of the vehicle 10 and the transportation system 90 is hereby incorporated by reference to apply to the vehicle 210 and the transportation system 290, except in instances when it conflicts with the specific description and drawings of the vehicle 210 and the transportation system 290 herein.

The vehicle 210 includes a floor 224 and a seat 225 as shown in FIGS. 11-13. The seat 225 is coupled to the floor 224 and includes a seat back 229. The seat back 229 extends upwardly from the floor 224. The tablet computer dock 212 is coupled to a back side 231 of the seat back 229 so that the tablet computer 214 is positioned for use by a user behind the seat 225 (i.e. a second or third row passenger). In the illustrative embodiment, the vehicle 210 is configured to perform processes 110 and 150 as described herein.

Figures 14, 15, 16:
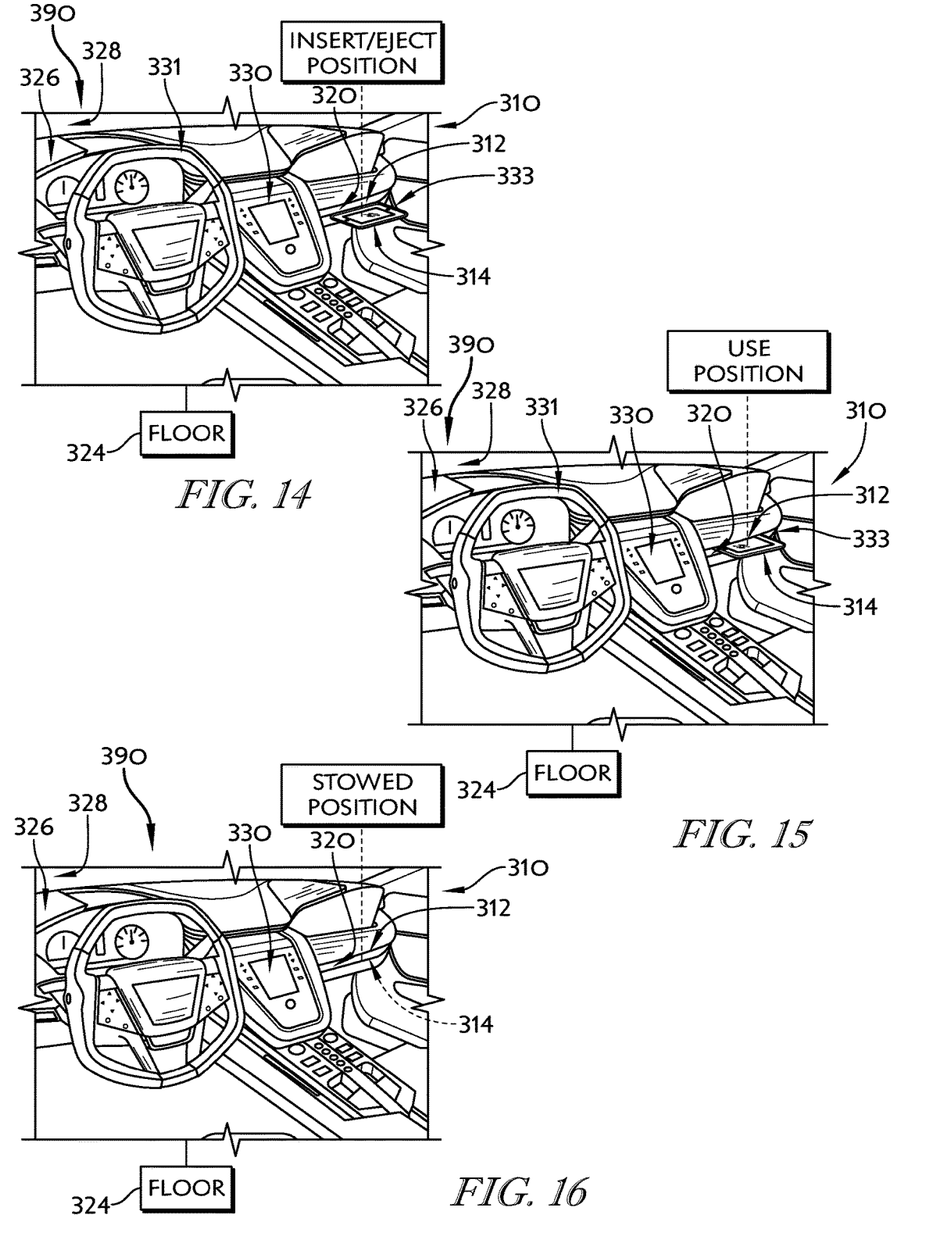
FIG. 14 is a perspective view of the third passenger vehicle showing the tablet computer moved to an insert/eject position in the tablet computer dock.
FIG. 15 is a view similar to FIG. 11 showing the tablet computer moved to a use position in the tablet computer dock.
FIG. 16 is a view similar to FIGS. 11 and 12 showing the tablet computer moved to a stowed position in the tablet computer dock.

A third illustrative vehicle 310 is shown in FIGS. 14-16. The vehicle 310 is configured for use in a transportation system 390 and is substantially similar to the vehicle 10 shown in FIGS. 1-10 and described herein. Accordingly, similar reference numbers in the 300 series indicate features that are common between the vehicle 10 and the vehicle 310. The description of the vehicle 10 and the transportation system 90 is hereby incorporated by reference to apply to the vehicle 310 and the transportation system 390, except in instances when it conflicts with the specific description and drawings of the vehicle 310 and the transportation system 390 herein.

The illustrative vehicle 310 includes a floor 324, a dashboard 326 arranged above the floor 324, and a windshield 328 extending upwardly from the dashboard 326. The vehicle 310 also includes a steering wheel 331 arranged on a drivers side of the dashboard 326, a glove box 333 arranged on a passenger side of the dashboard 326, and a user interface 330 mounted to the dashboard 326 between the steering wheel 331 and the glove box 333.

The compartment 320 defined by the tablet receiver 316 of the tablet computer dock 312 is arranged inside the dashboard 326. The compartment 320 is illustratively located between the floor 324 and the windshield 328 as shown in FIGS. 14-16. More specifically, the compartment 320 is located between the glove box 333 and the windshield 328. Also, the compartment 320 is oriented to lie in a plane substantially parallel to a plane defined by the floor 324 as suggested in FIGS. 14-16.

The market penetration of mobile computing devices, and in particular tablet computers, is expanding as costs lower and feature sets grow. Use of such devices in passenger environments is also expanding as a function of increased ownership and increased integration with passenger vehicles (along with other devices). This expansion of use presents technical problems relating to the transportation of and use of mobile computing devices within passenger vehicles.

Embodiments of the present disclosure provide a solution to the technical problem that mobile computing devices, in particular tablet computers, are targets of theft when left unattended in passenger vehicles. Because such devices are valuable on secondary markets and sometimes hold valuable and/or personal information, the targeting of mobile devices for theft will likely continue and expand. Accordingly, the present disclosure provides a dock in which a mobile computing device is hidden from view inside a passenger vehicle when the mobile device is in a stowed position within the dock.

Embodiments of the present disclosure provide a solution to the technical problem that mobile computing devices, in particular tablet computers, can be difficult to use in passenger vehicles while being held by a user. Because such devices can require two hands to hold and manipulate, the use of mobile computing devices can be difficult for drivers and/or passengers. Accordingly, the present disclosure provides a dock in which a mobile computing device is supported inside a passenger vehicle for one-handed or voice control by a driver and/or passenger.

Although certain illustrative embodiments have been described in detail above, variations and modifications exist within the scope and spirit of this disclosure as described and as defined in the claims included in this application.

The invention claimed is:

1. A tablet computer dock comprising
a tablet receiver defining a compartment sized to receive a tablet computer, the compartment accessible through a slot, and
positioning means for moving a tablet computer removably inserted into the compartment through the slot from a use position in which an interface portion of the tablet computer is exposed outside the compartment and a supported portion of the tablet computer is received in the compartment to a stowed position in which the entire tablet computer is received inside the compartment so that the tablet computer is supported for operation by a user when the positioning means moves the tablet computer to the use position and so that the tablet computer is enclosed in the tablet receiver to discourage theft of the tablet computer when the positioning means moves the tablet computer to the stowed position,
wherein each component of the positioning means is located entirely within the compartment during movement of the tablet computer to each of the insert/eject, use, and stowed positions,
wherein the positioning means includes a controller, a sensor unit coupled to the controller and configured to detect when a tablet computer is inserted through the slot into the compartment, and a drive coupled to the controller, the drive coupled to the tablet receiver and arranged to engage a tablet computer inserted into the compartment through the slot,
wherein the drive includes a drive roller arranged inside the compartment to engage a tablet inserted into the compartment through the slot and a motor coupled to the drive roller,
wherein the sensor unit includes a drive sensor coupled to the motor and configured to detect electrical current in the motor created by rotation of the drive roller in response to a tablet computer being pushed into or pulled out of the compartment by a user.

2. The tablet computer dock of claim 1, wherein the sensor unit includes an optical sensor configured to detect when a tablet computer is inserted into the compartment through the slot.

3. The tablet computer dock of claim 1, wherein the tablet receiver includes a frame and a plurality of passive rollers coupled to the frame, the passive rollers arranged inside the compartment and arranged to engage opposing sides of a tablet computer inserted into the compartment through the slot.

4. The tablet computer dock of claim 3, wherein the frame includes an insert guide coupled to the frame and formed to include a concave surface sized to correspond to a convex back side of a tablet computer.

5. A passenger vehicle comprising
an electrical system configured to communicate with a tablet computer, and
a tablet computer dock for supporting a tablet computer, the tablet computer dock including a tablet receiver defining a compartment sized to receive a tablet computer, the compartment accessible through a slot, and a tablet positioner including a controller, a sensor unit coupled to the controller and configured to detect when a tablet computer is inserted into the compartment through the slot, and a drive coupled to the controller and to the tablet receiver, the drive configured to engage a tablet computer inserted into the compartment through the slot and to move a tablet computer received in the compartment between an insert/eject position wherein an insert portion of a tablet computer is received in the compartment, a use position wherein a support portion, larger than the insert portion of a tablet computer, is received in the compartment, and a stowed position wherein all of a tablet computer is received in the compartment,
wherein the tablet receiver includes a frame and a plurality of passive rollers coupled to the frame, the passive rollers arranged inside the compartment and arranged to engage opposing sides of a tablet computer inserted into the compartment through the slot,
and further wherein the tablet receiver includes a support post is coupled to the frame providing support to the tablet computer while in the use position,
wherein each component of the tablet receiver is located entirely within the compartment during movement of the tablet computer to each of the insert/eject, use, and stowed positions,
wherein the drive includes a drive roller arranged inside the compartment to engage a tablet inserted into the compartment through the slot and a motor coupled to the drive roller,
wherein the sensor unit includes a drive sensor coupled to the motor and configured to detect electrical current in the motor created by rotation of the drive roller in response to a tablet computer being pushed into or pulled out of the compartment by a user.

6. The tablet computer dock of claim 5, wherein the drive includes a drive roller arranged inside the compartment to engage a tablet inserted into the compartment through the slot and a motor coupled to the drive roller.

7. The passenger vehicle of claim 6, wherein the sensor unit includes a drive sensor coupled to the motor and configured to detect electrical current in the motor created by rotation of the drive roller in response to a tablet computer being pushed into or pulled out of the compartment by a user.

8. The passenger vehicle of claim 5, wherein the frame includes an insert guide coupled to the frame and formed to include a concave surface sized to correspond to a convex back side of a tablet computer.

9. The passenger vehicle of claim 5, wherein the passenger vehicle includes a floor, a dashboard arranged above the floor, and a windshield extending upwardly from the dashboard.

10. The passenger vehicle of claim 9, wherein the electrical system includes a user interface mounted to the dashboard, the compartment defined by the tablet receiver is inside the dashboard between the windshield and the user interface, and the compartment is arranged in a plane substantially perpendicular to a plane defined by the floor.

11. The passenger vehicle of claim 9, wherein the compartment defined by the tablet receiver is inside the dashboard between the floor and the windshield, and the compartment is arranged in a plane substantially parallel to a plane defined by the floor.

12. The passenger vehicle of claim 5, wherein the passenger vehicle includes a floor and a seat, and the tablet receiver is coupled to the seat.

13. A passenger vehicle comprising
an electrical system, and
a tablet computer dock for supporting a tablet computer, the tablet computer dock including a tablet receiver defining a compartment sized to receive a removable tablet computer, the compartment accessible through a slot, and a tablet positioner including a controller coupled to the electrical system, a sensor unit coupled to the controller, and a drive coupled to the controller, the drive configured to engage a tablet computer inserted into the compartment through the slot and to move the tablet computer between an insert/eject position wherein an insert portion of a tablet computer is received in the compartment, a use position wherein a support portion larger than the insert portion is received in the compartment and supported in this position by a support post coupled to a frame in the tablet receiver, and a stowed position wherein all of a tablet computer is received in the compartment,
wherein the sensor unit is configured to detect when a tablet computer is inserted into the compartment through the slot and to generate a tablet insert signal, the electrical system is configured to generate a vehicle on signal and a vehicle off signal, and the controller is configured to move a tablet computer inserted into the compartment through the slot from the insert/eject position to the use position in response to receiving the tablet insert signal and the vehicle on signal,
wherein the controller is configured to move a tablet computer inserted into the compartment through the slot from the insert/eject position to the stowed position in response to receiving the tablet insert signal and the vehicle off signal,
wherein each component of the tablet receiver is located entirely within the compartment during movement of the tablet computer to each of the insert/eject, use, and stowed positions,
wherein the drive includes a drive roller arranged inside the compartment to engage a tablet inserted into the compartment through the slot and a motor coupled to the drive roller,
wherein the sensor unit includes a drive sensor coupled to the motor and configured to detect electrical current in the motor created by rotation of the drive roller in response to a tablet computer being pushed into or pulled out of the compartment by a user.

14. The passenger vehicle of claim 13, wherein the controller is configured to move a tablet computer from the use position to the stowed position in response to receiving a stow signal user input.

15. The passenger vehicle of claim 14, wherein the sensor unit is configured to detect when a tablet computer is being pushed by a user from the use position toward the stowed position and to generate the stow signal user input.

16. The passenger vehicle of claim 13, wherein the controller is configured to move a tablet computer from the use position to the insert/eject position in response to receiving an eject user input.

17. The passenger vehicle of claim 16, wherein the sensor unit is configured to detect when a user moves a hand over the slot and to generate the eject signal user input.

18. A transportation system comprising
a tablet computer including a controller, a user interface coupled to the controller of the tablet computer, and a transceiver coupled to the controller of the tablet computer, and
a passenger vehicle including a tablet computer dock and an electrical system,
the tablet computer dock including a tablet receiver defining a compartment sized to receive a tablet computer removably inserted through a slot and a tablet positioner configured to move the tablet computer between an insert/eject position wherein an insert portion of a tablet computer is received in the compartment, a use position wherein a support portion larger than the insert portion is received in the compartment, and a stowed position wherein all of a tablet computer is received in the compartment,
the electrical system including a controller coupled to the tablet positioner, a user interface coupled to the controller of the electrical system, and a transceiver coupled to the controller of the electrical system,
wherein the controller of the electrical system is configured to receive a signal from the tablet positioner indicative of the tablet computer being inserted into the tablet receiver and to send a signal to the tablet computer to launch a vehicle-specific application,
wherein the controller of the electrical system is configured to send a signal to the tablet computer to launch a graphic display in response to receiving the signal from the tablet positioner indicative of the tablet computer being inserted into the tablet receiver,
wherein the controller of the electrical system is configured to send signal to the tablet computer to launch the vehicle-specific application in response to receiving a signal from the tablet positioner indicative of the tablet computer moving to the use position from the stowed position,
wherein the tablet receiver includes a sensor unit coupled to the controller and configured to detect when a tablet computer is inserted through the slot into the compartment, and a drive coupled to the controller, the drive coupled to the tablet receiver and arranged to engage a tablet computer inserted into the compartment through the slot, wherein each component of the tablet receiver is located entirely within the compartment during movement of the tablet computer to each of the insert/eject, use, and stowed positions, wherein the drive includes a drive roller arranged inside the compartment to engage a tablet inserted into the compartment through the slot and a motor coupled to the drive roller, wherein the sensor unit includes a drive sensor coupled to the motor and configured to detect electrical current in the motor created by rotation of the drive roller in response to a tablet computer being pushed into or pulled out of the compartment by a user.

19. The transportation system of claim 18, wherein the controller of the electrical system is configured to send a signal to the tablet computer to launch a sleep mode in response to receiving a signal from the tablet positioner indicative of the tablet computer moving to the stowed position.

20. A method of positioning a tablet computer in a tablet receiver included in a tablet computer dock, the method comprising receiving a tablet insert signal, and moving the tablet computer from an insert/eject position to a use position in response to receiving the tablet insert signal via rubber motor-driven drive rollers, wherein an insert portion of the tablet computer is received in a compartment formed by the tablet receiver when the tablet computer is in the insert/eject position, and a support portion, larger than the insert portion, is received in the compartment when the tablet computer is in the use position wherein the tablet receiver includes a frame and a plurality of passive rollers coupled to the frame, the passive rollers arranged inside the compartment and arranged to engage opposing sides of a tablet computer inserted into the compartment through the slot wherein each component of the tablet receiver is locate entirely within the compartment during movement of the tablet computer to each of the insert/eject, use, and stowed positions, wherein the tablet receiver includes a sensor unit having a drive sensor coupled to a motor and configured to detect electrical current in the motor created by rotation of the drive rollers in response to a tablet computer being pushed into or pulled out of the compartment by a user.

21. The method of claim 20, further comprising moving the tablet computer to a stowed position in response to receiving a stow signal from a sensor unit, wherein all of the tablet computer is received in the compartment when the tablet computer is in the stowed position.

22. The method of claim 21, wherein tablet stow signal is received from a drive sensor coupled to a motor configured to move the tablet computer from the use position to the stowed position.

23. The method of claim 21, further comprising sending a sleep mode signal to the tablet computer in response to receiving the stow signal.

24. The method of claim 23, further comprising receiving a tablet moving to eject position signal from the tablet computer dock and sending a wake-up signal to the tablet computer.

25. The method of claim 20, wherein the tablet computer is moved from the insert/eject position by a drive roller situated in the compartment and arranged to engage the tablet computer when the tablet computer is inserted into the compartment.

26. The method of claim 20, wherein the tablet insert signal is received from a drive sensor coupled to a motor configured to move the tablet computer from the insert/eject position to the use position.

27. The method of claim 20, further comprising receiving a tablet moving to eject position signal from the tablet computer dock and sending a close vehicle application signal to the tablet computer.

* * * * *